(12) United States Patent
Juan et al.

(10) Patent No.: US 9,166,433 B2
(45) Date of Patent: Oct. 20, 2015

(54) SELF-CONTAINED MOTORIZATION SYSTEM

(76) Inventors: Antoine Juan, Champniers (FR); Florian Gardes, L'Isle D'Espagnac (FR); Jérôme Penigaud, Ruelle sur Touvre (FR)

( * ) Notice: Subject to any disclaimer, the term of this patent is extended or adjusted under 35 U.S.C. 154(b) by 12 days.

(21) Appl. No.: 13/638,439

(22) PCT Filed: Mar. 29, 2011

(86) PCT No.: PCT/IB2011/051336
§ 371 (c)(1),
(2), (4) Date: Nov. 16, 2012

(87) PCT Pub. No.: WO2011/121543
PCT Pub. Date: Oct. 6, 2011

(65) Prior Publication Data
US 2013/0057182 A1    Mar. 7, 2013

(30) Foreign Application Priority Data

Mar. 29, 2010 (EP) ..................................... 10305321

(51) Int. Cl.
*H02P 27/00* (2006.01)
*H02J 7/00* (2006.01)
*B60L 11/18* (2006.01)

(52) U.S. Cl.
CPC ........... *H02J 7/0054* (2013.01); *B60L 11/1805* (2013.01); *B60L 11/1822* (2013.01); *B60L 11/1866* (2013.01); *B60L 2270/145* (2013.01); *Y02T 10/7005* (2013.01);

(Continued)

(58) Field of Classification Search
USPC ............. 318/106–109, 139, 400.3, 812, 440, 318/442, 459, 478, 479, 500, 504
See application file for complete search history.

(56) References Cited

U.S. PATENT DOCUMENTS 3,963,976 A * 6/1976 Clark ............................ 320/139
5,659,465 A * 8/1997 Flack et al. .................... 363/71

(Continued)

FOREIGN PATENT DOCUMENTS

| EP | 0 905 855 A2 | 3/1999 |
| JP | 2003-48177 A | 2/2003 |

(Continued)

OTHER PUBLICATIONS

International Search Report for PCT/IB2011/051336 dated Feb. 6, 2012.

(Continued)

*Primary Examiner* — Bentsu Ro
(74) *Attorney, Agent, or Firm* — Sughrue Mion, PLLC

(57) ABSTRACT

The invention relates to a self-contained motorization system comprising at least one electric motor (9), a controller (8) adapted to drive the operation of the electric motor (9), a set of accumulators of power type (5) adapted to feed the motor (9), a central control unit (7), a base (3) adapted for removably receiving a set of accumulators of energy type (4) and a direct current converter (2) adapted for connecting the set of accumulators of energy type (4) to the set of accumulators of power type.

Figure 1:
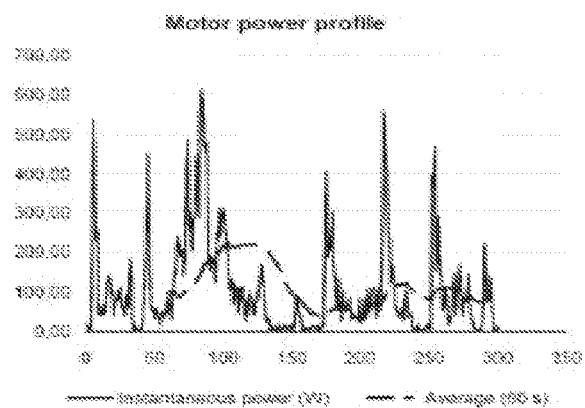

The self-contained motorization system makes it possible to meet both high power needs and significant self-containment needs, while allowing easy maintenance and the use of technologies not subject to transport restrictions.

22 Claims, 6 Drawing Sheets

(52) U.S. Cl.
CPC ......... *Y02T 10/7061* (2013.01); *Y02T 10/7072* (2013.01); *Y02T 90/124* (2013.01); *Y02T 90/14* (2013.01)

(56) References Cited

U.S. PATENT DOCUMENTS

| | | |
|---|---|---|
| 5,773,962 A | 6/1998 | Nor |
| 5,780,980 A | 7/1998 | Naito |
| 6,313,546 B1 | 11/2001 | Nishimura et al. |
| 6,791,295 B1* | 9/2004 | Berels .......................... 320/103 |
| 7,148,637 B2* | 12/2006 | Shu et al. ..................... 318/139 |
| 8,698,351 B2* | 4/2014 | Castelaz et al. ................. 307/25 |
| 2002/0046891 A1* | 4/2002 | Honda et al. ................... 180/220 |
| 2004/0201365 A1 | 10/2004 | Dasgupta et al. |
| 2005/0122071 A1 | 6/2005 | King et al. |
| 2006/0255755 A1 | 11/2006 | Shu et al. |
| 2008/0211459 A1 | 9/2008 | Choi |
| 2012/0256568 A1* | 10/2012 | Lee ............................... 318/139 |

FOREIGN PATENT DOCUMENTS

| | | |
|---|---|---|
| JP | 2005-245145 A | 9/2005 |
| JP | 2009-183074 A | 8/2009 |
| JP | 2010-38592 A | 2/2010 |
| WO | 2005/027345 A1 | 3/2005 |

OTHER PUBLICATIONS

International Preliminary Examination Report for PCT/IB2011/051336; Oct. 11, 2012.
Communication dated Dec. 2, 2014 from the Japanese Patent Office in counterpart application No. 2013-502014.

* cited by examiner

SELF-CONTAINED MOTORIZATION SYSTEM

CROSS REFERENCE TO RELATED APPLICATIONS

This application is a National Stage of International Application No. PCT/IB2011/051336 filed on Mar. 29, 2011, which claims priority from European Patent Application No. 10305321.1, filed on Mar. 29, 2010, the contents of all of which are incorporated herein by reference in their entirety.

The invention relates to a self-contained electric motorization system. Such a system may be used in a vehicle wheel or in a tool.

A small car may be equipped with an electric motorization system making it possible to move the vehicle without effort, or with limited effort by the user. Motorization systems are known by the manufacturers of electric carts, electrically-assisted bicycles, and electric or hybrid small cars.

Such a system comprises one or more electric motors, a controller that drives the electric motors, a battery made up of accumulators forming an electrical energy reserve, and a control providing the interface with the user and making it possible to act on the motor.

Documents WO-A-2004/050385, WO-A-03/030336 and WO-A-03/097437 each describe a self-contained motorization system comprising a motor, accumulators, and a controller mounted in a single assembly.

The motor of such a self-contained system consumes a variable instantaneous electric power, which depends on the power needs required to pull the vehicle or use the tool. The consumed power may go from zero to several times the power rating of the electric motor. For example, in the case of application to a small vehicle such as a bicycle or scooter, the power consumed going up a hill will be significant, while the power consumed going downhill will be zero. Likewise, in the case of application to a tool such as a drill, the power consumed during penetration of a concrete wall will be significant, while the power consumed to penetrate a plaster wall will be low.

FIG. 1 shows a graph of the electrical power read on a traction chain of an electrically-assisted bicycle with a power rating of 175 Watts over a period of 5 minutes. The curve in a solid line shows the instantaneous power, and the curve in a broken line shows the average power over 1 minute. In the example of FIG. 1, the instantaneous power varies from 0 to 600 Watts and the average power is approximately 100 Watts. To operate in a self-contained way, the traction chain must embed a power battery capable of supplying the maximum current sought by the motor.

Figure 2:
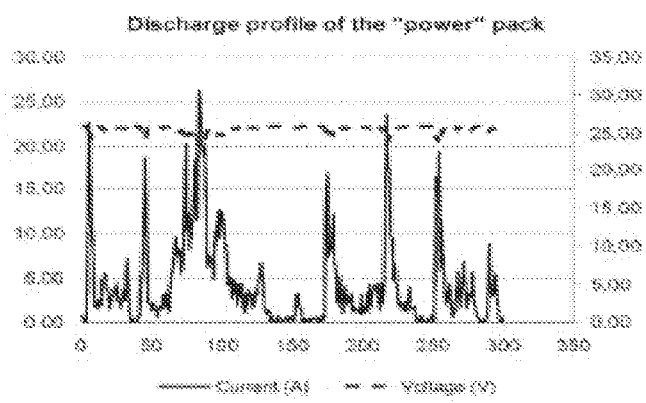

FIG. 2 shows a graph of the discharge profile of the battery used in the traction chain of FIG. 1. In the example, the battery has a rated voltage of 24 Volts and provides current peaks exceeding 25 Amperes. The power that must be supplied by the battery requires the use of accumulators with a high ratio of power to weight (W/kg), called accumulators of power type (also known under the wording "power cell"). These accumulators are capable of providing high current peaks, but offer less energy than so-called accumulators of energy type (also known under the wording "energy cell"), i.e. accumulators with a high ratio of energy to weight (Wh/kg), but not able to provide strong currents.

Documents FR-A-2 909 325 and GB-A-1 131 171 each describe a device for feeding an electric machine comprising two energy sources. A first source comprises batteries and a second source comprises a fuel cell.

Document FR-A-2 866 279 describes a drive system for the drive wheels of a motor vehicle with electric motorization comprising two different complete power chains. Each motorization chain comprises an electric motor and a rechargeable battery, the power of the motor of the second chain being greater than the power of the motor of the first chain.

Document FR-A-2 836 604 describes a dual-voltage electric power supply system for a motor vehicle. A high-voltage network comprises a high-voltage battery and a low-voltage network comprises a low-voltage battery. The system comprises a reversible electrical energy converter arranged so as to provide electrical energy to the low-voltage network from the electrical energy stored in the high-voltage battery in a step-down mode, and to provide electrical energy to the high-voltage network from the electrical energy stored in the low-voltage battery in a step-up mode.

Document FR-A-2 790 148 describes an energy storage system that comprises at least two branches arranged in parallel, each branch comprising at least one electrochemical generator, the branches having equal rated voltages and different ratios of power to energy.

Document U.S. Pat. No. 5,670,266 describes a hybrid energy storage system comprising a rechargeable battery and a capacitor. The capacitor is adapted to meet the significant instantaneous power needs of the electrical device.

Documents GB-A-2 275 378, DE-A-198 13 146, GB-A-1 476 011 and GB-A-1 473 798 each describe a power source comprising a first battery of the energy type and a second battery of the power type.

The known devices, comprising a combination of power type and energy type batteries, are not well-suited to self-contained electric motorization systems for small vehicles or tools. In fact, the known devices are relatively heavy and bulky and complex to maintain, in particular because the various elements of the battery device are not easy to separate from the vehicle or device they equip.

There is therefore a need for a self-contained motorization system that makes it possible to meet both the high power needs and significant self-containment needs, while allowing easy maintenance—and in particular recharging—and making it possible to use technologies not subject to transportation restrictions.

To that end, the invention proposes a self-contained motorization system comprising a set of accumulators of power type associated with a motor and a removable and transportable set of accumulators of energy type.

More particularly, the invention proposes a self-contained motorization system comprising:
  at least one electric motor;
  a controller adapted to drive the operation of the electric motor;
  a set of accumulators of power type adapted to feed the motor;
  a central control unit;
  a base adapted for removably receiving a set of accumulators of energy type;
  a direct current converter adapted to connect the set of accumulators of energy type to the set of accumulators of power type.

The invention also proposes a self-contained motorization system comprising:
  at least one electric motor;
  a controller adapted to drive the operation of the electric motor;

a set of accumulators of power type adapted to feed the motor;

a set of accumulators of energy type;

a central control unit;

a base adapted to removably receive the set of accumulators of energy type;

a direct current converter adapted to connect the set of accumulators of energy type to the set of accumulators of power type.

According to specific embodiments, the self-contained motorization system according to the invention may comprise one or more of the following features:

the direct current converter is adapted to control the charge of the set of accumulators of power type by the set of accumulators of energy type;

the central unit is adapted to command the direct current converter;

the system also comprises a cutoff member commanded by the central control unit and adapted to interrupt the charge of the set of accumulators of power type by the set of accumulators of energy type;

the cutoff member is commanded so as to charge the set of accumulators of power type with a pulsed charge profile;

the system also comprises a case bearing and standing together the set of accumulators of power type, the electric motor, the controller, and the central control unit;

the case also bears the direct current converter;

the set of accumulators of energy type embeds the direct current converter;

the case also bears the base adapted to receive the set of accumulators of energy type;

the base is adapted to receive a plurality of sets of accumulators of energy type; preferably each set of accumulators of energy type embedding a direct current converter;

the set of accumulators of power type uses the Ni-MH technology;

the direct current converter is of the constant current output type;

the set of accumulators of power type uses the Lithium technology;

the direct current converter is of the constant current output and constant voltage output type;

the set of accumulators of energy type uses the Lithium technology;

the capacity of each set of accumulators is less than or equal to 100 Wh.

The invention also relates to a vehicle wheel comprising at least one self-contained motorization system according to the invention, as well as a tool comprising at least one self-contained motorization system according to the invention.

The invention also proposes a method for managing the charge of the set of accumulators of power type of the preceding self-contained system, the method comprising:

computing or measuring the average current or the average energy consumed by the electric motor; and transmitting, using the central control unit, an instruction to adapt the output of the direct current converter to the average consumed current or the average consumed energy.

According to one embodiment, the base is adapted to receive a plurality of sets of accumulators of energy type each embedding a direct current converter, the method comprising the transmission by the central control unit of an instruction to adapt the output of each direct current converter to the average current or average energy consumed by the electric motor, the output of each direct current converter being adapted to ensure a discharge of the plurality of sets of accumulators of energy type that is:

sequential; or simultaneous, preferably when the average consumed current or the average consumed energy exceeds the maximum admissible discharge current or the maximum admissible discharge energy of a single set of accumulators of energy type.

Figure 3:
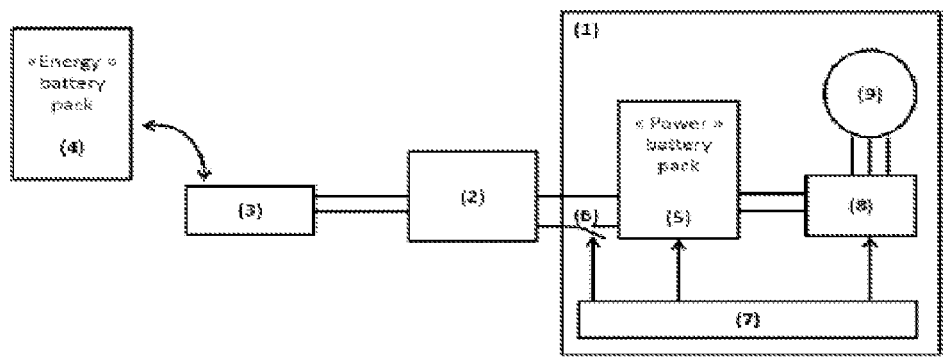
Figure 4:
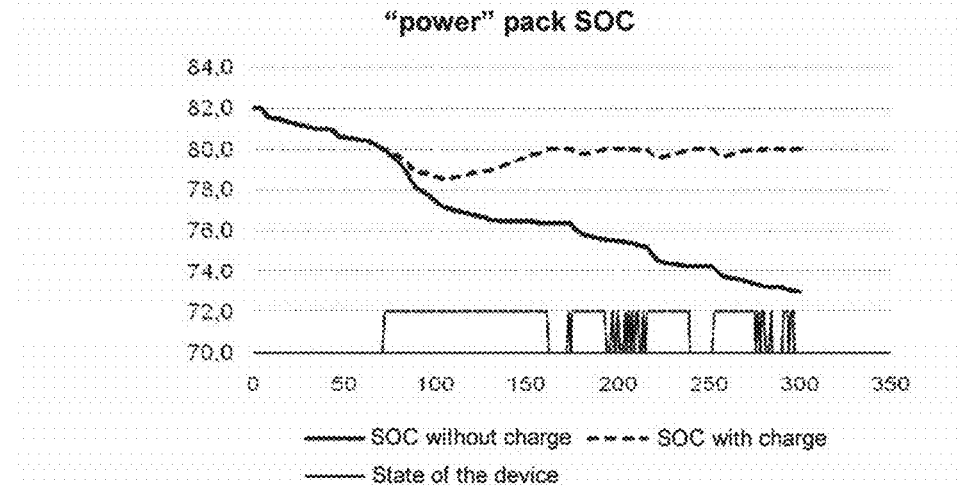
Figure 5:
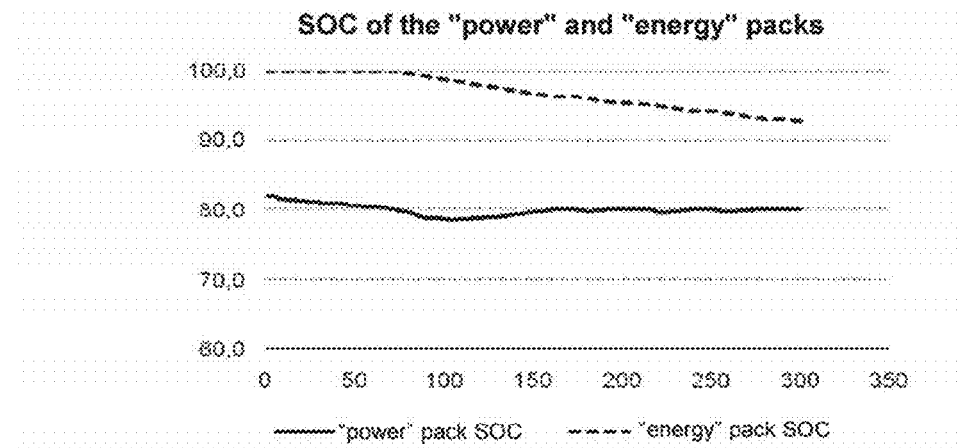
Figure 6:
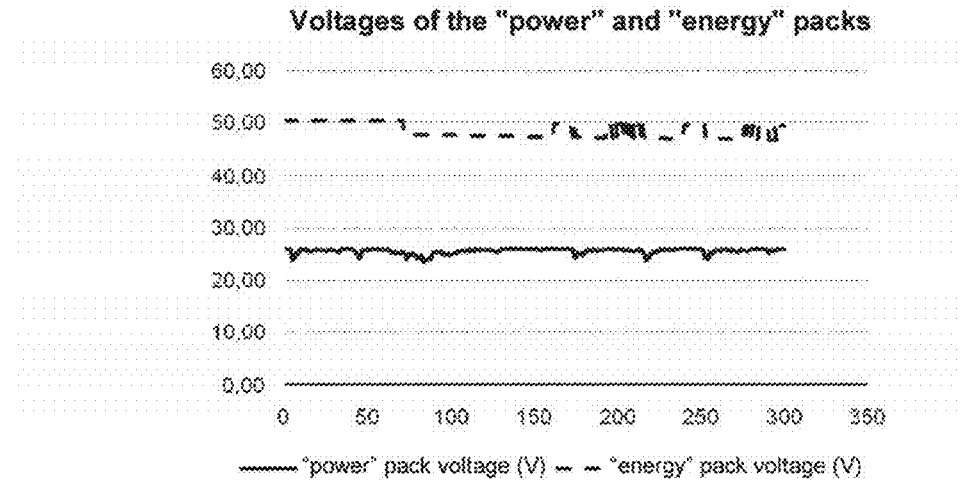
Figure 7:
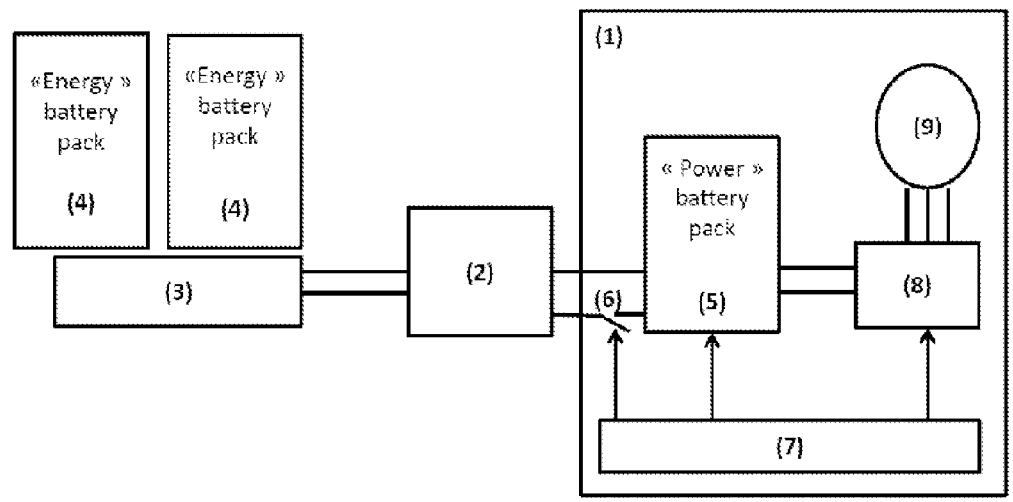
Figure 8:
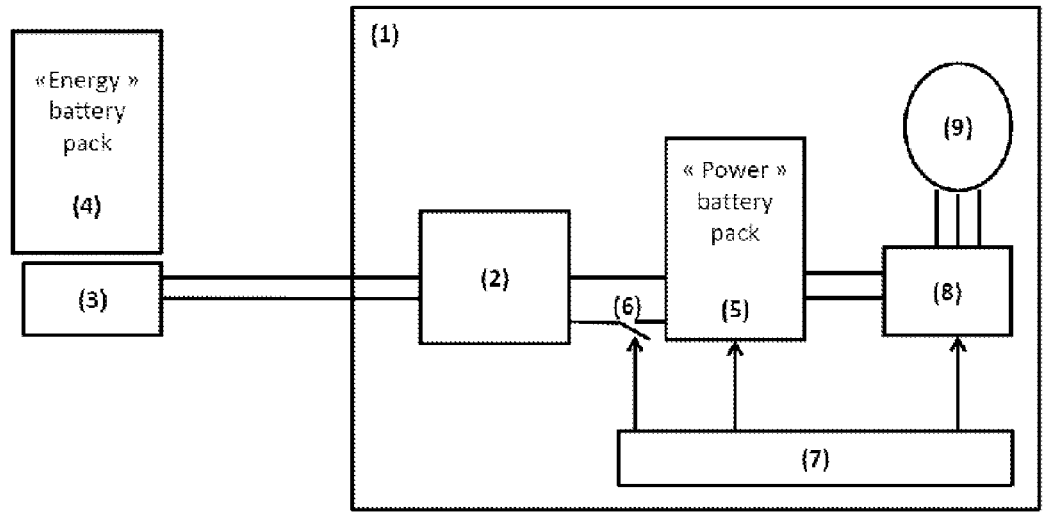
Figure 9:
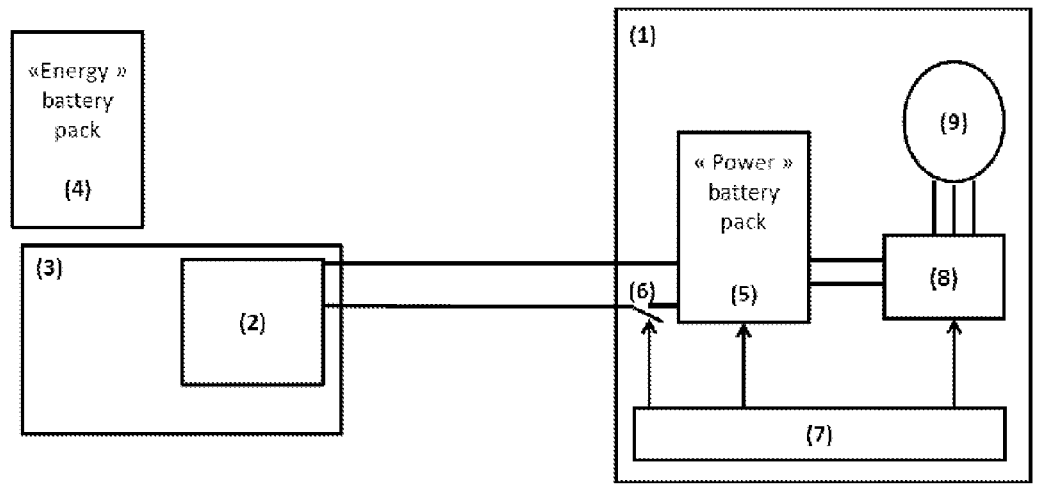
Figure 10:
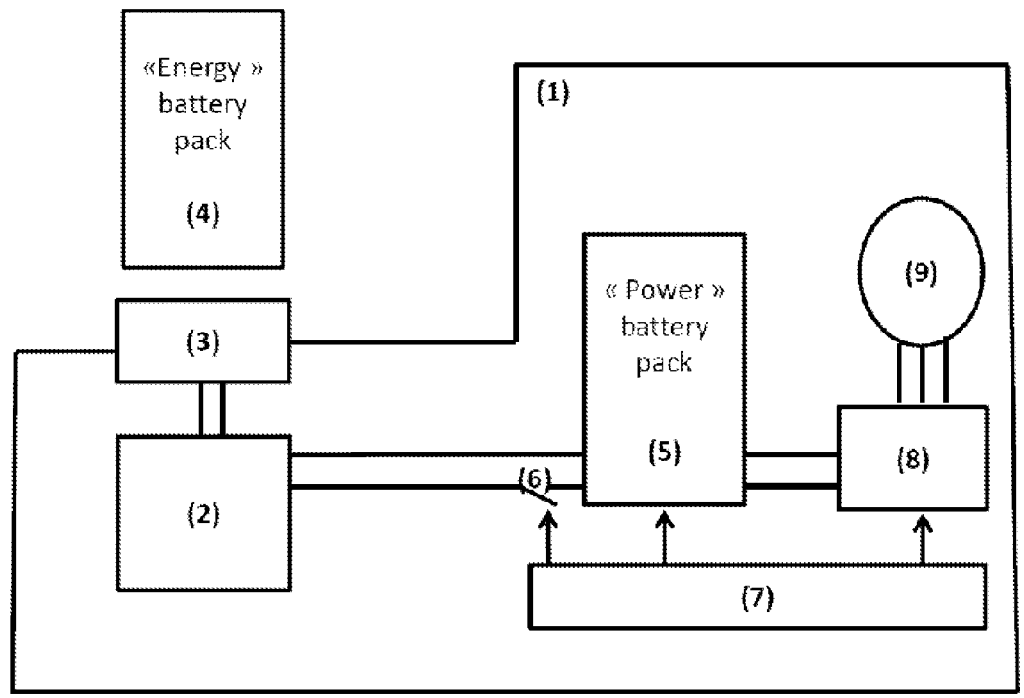
Figure 11:
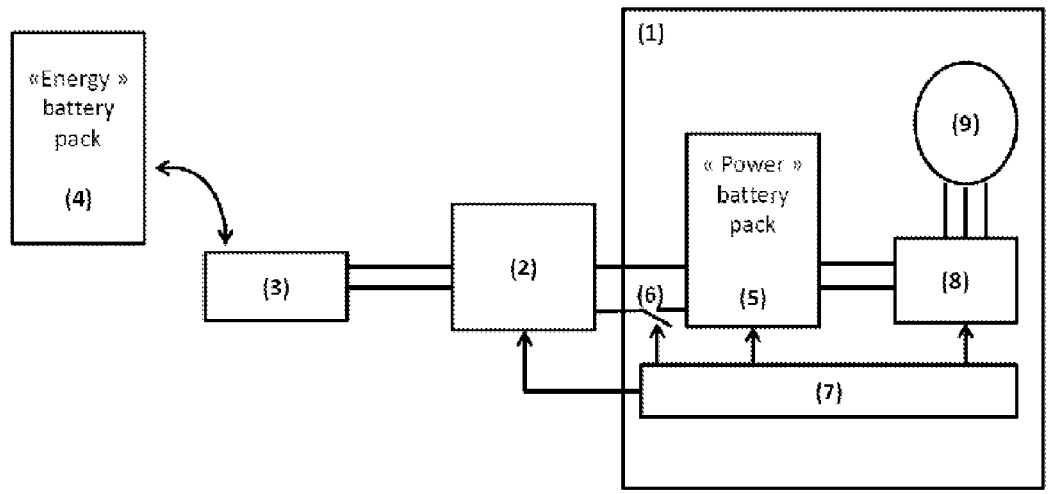
Figure 12:
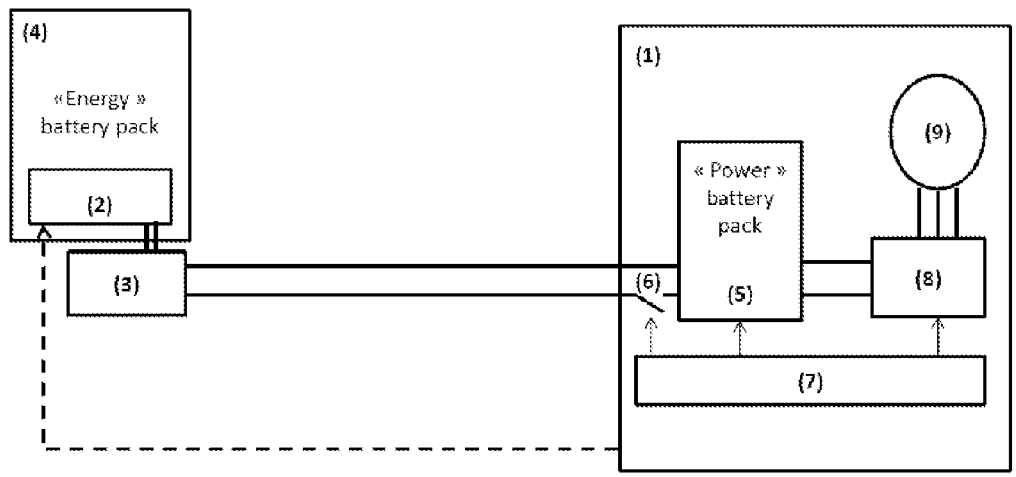
Figure 13:
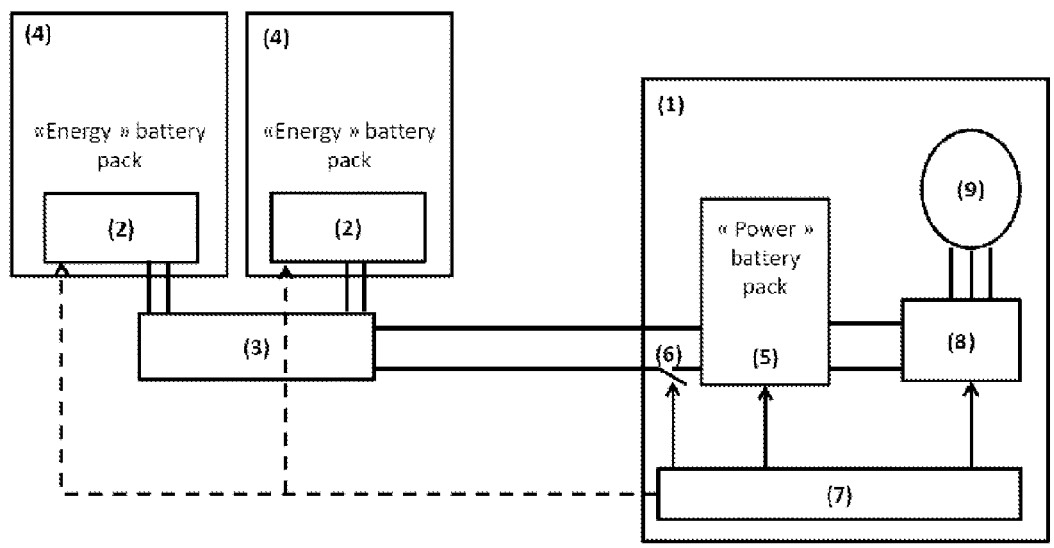

Other features and advantages of the invention will appear upon reading the following detailed description. This description is provided solely as an example, and in reference to the appended figures, which show:

FIG. 1, already described, a power profile of a self-contained motorization system over 5 minutes;

FIG. 2, already described, a discharge profile of a set of accumulators associated with the self-contained system of FIG. 1;

FIG. 3, a self-contained motorization system according to a first embodiment of the invention;

FIG. 4, a state of charge profile of a set of accumulators of power type with and without being associated with a set of accumulators of energy type;

FIG. 5, a state of charge profile of a set of accumulators of power type and a set of accumulators of energy type of a self-contained motorization system according to the invention;

FIG. 6, voltage profile of a set of accumulators of power type and a set of accumulators of energy type of a self-contained motorization system according to the invention;

FIG. 7, a self-contained motorization system according to a second embodiment of the invention;

FIG. 8, a self-contained motorization system according to a third embodiment of the invention;

FIG. 9, a self-contained motorization system according to a fourth embodiment of the invention;

FIG. 10, a self-contained motorization system according to a fifth embodiment of the invention;

FIG. 11, a self-contained motorization system according to a sixth embodiment of the invention;

FIGS. 12 and 13, self-contained motorization systems according to another embodiment of the invention.

The self-contained motorization system according to the invention will be described in relation to FIG. 3.

FIG. 3 shows a case 1 serving as a holder for an electric motor 9 and a set of accumulators of power type, hereafter designated "power battery 5" or by the expression ""power" battery pack." The power battery 5 is adapted for feeding the motor 9, for example through a controller 8 that drives the operation of the motor, i.e. direction and speed of rotation in particular. For certain applications in which the motor 9 only rotates in one direction and at a constant speed, the motor 9 can be commanded by a simple switch actuated by the user; the controller 8 may then be a simple switch of the on/off type. For certain applications, it is not necessary to provide a case 1; the elements of the system may be embedded directly into a housing of the application, such as the shell of a tool for example.

FIG. 3 also shows a central control unit 7 that supervises the management of the power battery 5 and drives the motor 9, through the controller 8 if applicable. FIG. 3 also shows a set of accumulators of energy type, hereafter designated by the expression "energy battery 4" or by the expression ""energy" battery pack." The energy battery 4 is removably arranged on a base 3. A direct current converter 2 connects the energy battery 4 to the power battery 5. FIG. 3 also shows a cutoff member 6 driven by the central unit 7 and making it possible to interrupt the electrical connection between the energy battery 4 and the power battery 5.

The electric motor 9 may be of the brushless direct current (brushless DC motor) type with permanent magnets. This motor has the advantage of being silent during operation and having a good lifetime. The case 1 may be made from an electrically insulating material and have mechanical properties that make it possible to guarantee maintenance of the elements and resistance to mechanical stresses undergone by the system, such as vibrations or impacts. For example, the case 1 may be made from ABS-PC (Acrylonitrile Butadiene Styrene/Polycarbonate) or a composite material. The case 1 may also be made from plastic containing fillers (mineral particles, for example) or reinforced plastic (for example by glass fibers).

The power battery 5 may use the Nickel Metal Hydride power technology or Lithium power technology, integrating the appropriate protective functions. The energy battery 4 may also use the Lithium energy technology and integrate the appropriate protective functions (i.e. short-circuit function and/or security function in case of overpressure, for example).

During operation, the power battery 5 provides the instantaneous current consumed by the motor 9 and receives an average current from the energy battery 4 regulated by the converter 2. The converter 2 ensures that the current supplied to the power battery 5 is substantially equal to the average current consumed by the system over a long period of time. The converter 2 has an output profile adapted to charge the power battery 5 directly. The charging of the power battery by the energy battery may be controlled by the converter 2 or the central unit 7. The central unit 7 may for example command the converter 2 (FIG. 11). The central unit 7 may also interrupt the charging of the power battery at any time using the cutoff member 6. The central unit 7 is in particular adapted to compute the state of charge (SOC) of the power battery 5 and determine whether the latter can or must receive energy from the energy battery 4. In fact, depending on the type of battery used, the charging control is more or less crucial. For example, in the case of Lithium type accumulators, overcharging may lead to deterioration of the accumulator. The central unit 7 may also include a control for balancing of the accumulators of the power battery.

In one embodiment, the cutoff member 6 may be used as a protective member for the power battery 5, the central unit 7 commanding the cutoff member 6 when it detects operation of the power battery 5 outside the rated ranges and/or when an SOC of 100% is reached. In one embodiment, the cutoff member 6 may be used to charge the power battery 5 with a pulsed charge profile, for example during charge balancing.

FIG. 4 illustrates the state of charge SOC of the power battery 5. The example of FIG. 4 corresponds to the five minute reading of the operation of the system illustrated in FIGS. 1 and 2, and shows the SOC of the power battery 5 without recharge (bold line), the SOC of the power battery 5 with recharge (broken line), and the active or inactive state of the recharge device (thin line). It will be noted that the state of charge of the power battery 5 without recharge decreases rapidly. The central unit 7 allows recharging of the power battery 5 by the energy battery 4 when the state of charge SOC is below a predefined threshold, for example 80%.

The power battery 5 is charged by the energy battery 4 through the converter 2. The converter 2 is a direct current converter. It has an output characteristic adapted to the type of power battery 5 embedded into the system.

If the power battery 5 is of the Lithium type, the output of the converter 2 is comparable to that of a CCCV (Constant Current/Constant Voltage) type charger with a voltage corresponding to the charge voltage of the battery (typically 4.2 Volts per accumulator). If the power battery 5 is of the Ni-MH type, the output of the converter 2 is of the CC (Constant Current) type with a current adapted to the charging rate of the accumulators and a sufficient voltage to charge the battery completely (typically 1.6 Volts per accumulator).

FIG. 5 illustrates the states of charge SOC of the power battery 5 (solid line) and the energy battery 4 (broken line), and FIG. 6 illustrates the voltages at the terminals of the power battery 5 (solid line) and the energy battery 4 (broken line).

The state of charge of the energy battery decreases when a current is consumed on the energy battery 4, converted by the converter 2 and used to recharge the power battery 5. In the example of FIG. 5, the reading starts with a charged energy battery 4, i.e. an SOC at 100%. The maximum discharge current of the energy battery 4 depends on the current admissible by the accumulators from which it is made up. Typically, the accumulators of energy type may be run down at a rate equal to 1 to 2 times their rating (C) equivalent to a discharge in one hour, i.e. 2 to 4 Amperes for a battery of 2 Ah, for example.

The charging current for the power battery 5 is delivered by the converter 2 and may be greater than the discharge current of the energy battery 4 if the voltage of the power battery 5 is lower than the voltage of the energy battery 4. In that case, the converter 2 is of the "buck" or step-down type. The voltage of the energy battery 4 may also be weaker than the voltage of the power battery 5, in which case the converter 2 is of the "boost" or step-up type.

In the example of FIGS. 5 and 6, the energy battery 4 is made up of accumulators of 2.2 Ah and has a voltage comprised between 46 and 48 Volts during operation. The power battery 5 has a voltage of approximately 26 Volts. The energy battery 4 is run down at a current of 3.3 Amperes (i.e. 1.5 C or 1.5 times the rating of the battery) when the system is active. The converter 2 is of the buck type with an output of 95%; the charging current received by the power battery 5 is approximately 6 Amperes, and decreases as the energy battery 4 becomes run down, as its voltage decreases.

In this way, the system according to the invention makes it possible to provide the power battery 5 with a recharge current greater than the average current consumed by the motor 9 from the energy consumed on an energy battery 4 that alone could not provide the instantaneous power needed by the electric motorization. The power battery 5 embedded into the system is almost never run down, since the energy it supplies to the motor 9 is on average compensated by the energy taken from the energy battery 4.

The energy battery 4 is removable; it may thus be recharged outside the system, thereby simplifying maintenance operations. In particular, it is possible to replace a run-down energy battery with a new, charged energy battery 4, which may be done easily, quickly, and potentially without interrupting the operation of the system. In fact, the self-contained motorization system may operate with reduced self-containment in the absence of the energy battery 4, the power battery 5 being dimensioned to provide the instantaneous power requested by the motor 9.

It is also possible to recharge the system completely, i.e. the power battery 5 and the energy battery 4 installed on the base 3. In that case, a charger adapted to the energy battery 4 is connected upstream of the converter 2 to recharge the energy battery 4 and allow recharging of the power battery 5 at the same time using the converter 2.

Generally speaking, only the energy battery 4 is run down during use and requires recharging or replacement when it is dead. In the system according to the invention, the energy battery 4 is removable and may therefore be separated from the assembly without requiring a tool or complex operation, and may be connected and disconnected with respect to the system using an electrical connector embedded into the base 3. The removable nature of the energy battery 4 makes it possible to recharge it on a charging station independent of the system, to replace a run-down battery with a charged battery immediately, or to use several batteries successively to increase the self-containment of the system. When the energy battery 4 is replaced, the power battery 5 may temporarily supply the power for the motor 9 alone, which avoids having to stop the system.

The energy battery 4 may then be dimensioned with a weak enough capacity to remain below the regulatory transfer restriction thresholds. The energy battery 4 is dimensioned so as to supply the average power requested by the motor 9 instead of the maximum required power (in the example, 100 Watts instead of 600 Watts). This makes it possible to use lower power batteries, but also with less energy, and therefore smaller and lighter. When the energy battery uses technology subject to transport restrictions (for example, Lithium), the possibility of using a low capacity battery makes it possible to remain below the regulatory threshold (for example, 100 Wh for "Class 9" restrictions for Lithium), and thus to escape the restrictions.

FIGS. 7 to 10 illustrate different alternative embodiments of the self-contained motorization system according to the invention.

According to the embodiment of FIG. 7, the base 3 may receive several energy batteries 4 to still further increase the autonomy.

According to the embodiment of FIG. 8, the converter 2 is embedded into the case 1, and according to the embodiment of FIG. 9, the converter 2 is embedded into the base 3 of the energy battery.

According to the embodiment of FIG. 10, the base 3 and the converter 2 are embedded into the case 1.

According to the embodiment of FIG. 11, the central unit 7 commands the converter 2, for example with a device providing instructions. In this embodiment, the converter 2 may receive instructions from the central unit 7 so as to adapt its output to charge the power battery 5. The charge control and interruption functions may then be performed completely by driving the converter 2 by means of the central unit 7. The cutoff member 6 may be kept to provide redundant security.

According to the embodiments of FIGS. 12 and 13, the converter 2 may be embedded into each energy battery 4. In this way, each energy battery 4 and its respective converter 2 may be housed in a same case (not shown). In this embodiment, the case 1 is provided with no converter 2, i.e. the case 1 cannot embed a converter 2 to recharge the power battery 5. Depending on the alternatives, the base 3 may make it possible to receive a single energy battery 4 (FIG. 12) or several energy batteries 4 (FIG. 13). Embedding the converter 2 into each energy battery 4 makes it possible to limit the discharge of each energy battery 4 to the maximum discharge current admissible by the considered energy battery 4.

This makes it possible to provide additional security for the proposed system, in particular regarding protection from overcurrents of the energy battery 4.

According to this embodiment, embedding the converter 2 into the energy battery 4 makes it possible always to ensure the same output characteristics of the energy battery 4, irrespective of the rated voltage or current of the energy battery or the state of charge of the accumulators of the energy battery 4. In other words, the recharge current received by the power battery 5 may be indifferent to the state of the energy battery 4 used for the recharge. Thus, several different energy battery configurations 4 may then be compatible with the same self-contained motorization system, and in particular the power battery 5 of the system. Furthermore, in reference to FIG. 13, when several energy batteries 4 are used simultaneously, the converter 2 embedded into each energy battery 4 makes it possible to avoid current loops between the different energy batteries 4 connected on the same base 3. According to such an embodiment, current loops can even be avoided in the event the different energy batteries 4 have different rated voltages or different states of charge.

Similarly to the embodiment previously described in reference to FIG. 11, in the embodiments of FIGS. 12 and 13, the converter 2 of each energy battery 4 can receive instructions transmitted by the central control unit 7. To that end, the central unit 7 may comprise a device providing instructions that transmits the instructions to adapt the output of each converter 2 according to a computation or measurement of the average current or average energy consumed by the electric motor 9. The instructions received by the converters 2 of each energy battery 4 make it possible to adapt the output of each energy battery 4 to the charge of the power battery 5. The instructions may be transmitted by electric signal or by communication bus. In addition to the advantages previously described in reference to FIG. 11, sending instructions to the converters embedded into each energy battery makes it possible to:

configure the output characteristics of each energy battery 4 as a function of the request from the power battery 5;
switch the energy batteries 4 so as to use them in parallel for a simultaneous discharge of the energy batteries 4 or sequentially for discharge of the energy batteries 4 one after the other.

The simultaneous discharge mode of the energy batteries 4 advantageously makes it possible to force the use of several energy batteries 4 if the power requested to recharge the power battery is greater than the power that a single energy battery 4 can supply. Thus, when the average consumed current or the average consumed energy exceeds the maximum admissible discharge current or the maximum admissible discharge energy for a single set of accumulators of energy type, the central control unit may command the parallel discharge of at least two energy batteries 4. The transition to a simultaneous discharge mode may be made after verifying the presence of several energy batteries 4 on the base 3.

The motorization system according to the invention may be embedded into a wheel of a vehicle.

For example, the case 1 may be stood together with a chassis of the vehicle and an axle driven by the motor 9 may then be stood together with the wheel. The wheel may be rotated by means of the axle rotated by the electric motor 9, the case 1 remaining stationary. In another example, the axle driven by the motor is stood together with the chassis of the vehicle and the case 1 is stood together with the wheel. The wheel may be rotated by means of the case 1 rotated by the electric motor 9. Preferably, the elements borne by the case 1 are distributed so as to avoid a slack effect during the rotation. For example, the elements may be arranged around the driveshaft, such that the center of gravity of the system is located at the center of the case 1.

The self-contained motorization system may be installed in a number of different objects, for example in a small vehicle such as a bicycle, scooter, wheelbarrow, stretcher, or other vehicle, or in a tool, such as a drill or other tool.

In the case of an electrically-assisted bicycle equipped with a traction chain with a 250 Watt motor, the power battery must provide power peaks of up to 1 kW, and the average consumed power is 150 W.

On a traditional motorization system, the traction chain is made up of the motor and a removable battery that must be able to supply the power requested by the motor by itself.

According to the motorization system of the invention, the self-contained traction chain is made up of a motor 9 and a power battery 5 capable of supplying the power requested by the motor. The system also comprises a recharge device with a removable energy battery 4 capable of supplying the average power requested by the traction chain.

In the traditional system, a single 200 Wh battery must be used to feed the motor. This battery has a significant size and weight, is difficult to transport, and generally requires a specially adapted bicycle frame to be installed, given that bulk. Furthermore, if the battery is of the Lithium type, it is subject to "Class 9" transport restrictions, which require restrictive packaging and transport conditions for hazardous products.

In the system according to the invention, the self-contained traction chain may be fed by two removable, compact and light 100 Wh batteries. The case 1 comprising the motor 9 and the power battery 5 may be arranged on the wheel, and the frame must provide a housing for the energy battery 4. This energy battery 4 alone is capable of recharging the power battery 5 and has a minimum bulk, and does not require adaptation of the frame. Several energy batteries 4 may be used successively, one being able to be recharged while another is used, and they are easy to transport due to their small bulk. If the batteries are of the Lithium type, they are not subject to "Class 9" transport restrictions.

The system according to the invention therefore quite significantly improves the ease of transport of the energy necessary to propel an electric power-assisted bicycle: each battery has a size comparable to a laptop computer battery and is not subject to transport restrictions. The maintenance of such a system is also made easier by the possibility of separating the energy battery from the entire system.

Of course, the present invention is not limited to the embodiments described above as an example.

The invention claimed is:
1. A self-contained motorization system comprising:
    at least one electric motor;
    a controller adapted to drive the operation of the electric motor;
    a set of accumulators of power type adapted to feed the motor;
    a central control unit adapted to supervise the management of said set of accumulators and to drive the at least one electric motor through said controller;
    a base adapted for removably receiving a set of accumulators of energy type;
    a direct current converter adapted to connect the set of accumulators of energy type to the set of accumulators of power type.
2. The self-contained motorization system according to claim 1, wherein the direct current converter is adapted to control the charge of the set of accumulators of power type by the set of accumulators of energy type.
3. The self-contained motorization system according to claim 1, wherein the central unit is adapted to command the direct current converter.
4. The self-contained motorization system according to claim 1, also comprising a cutoff member commanded by the central control unit and adapted to interrupt the charge of the set of accumulators of power type by the set of accumulators of energy type.
5. The self-contained motorization system according to claim 4, wherein the cutoff member is commanded so as to charge the set of accumulators of power type with a pulsed charge profile.
6. The self-contained motorization system according to claim 1, also comprising a case bearing and standing together the set of accumulators of power type, the electric motor, the controller, and the central control unit.
7. The self-contained motorization system according to claim 6, wherein the case also bears the base adapted to receive the set of accumulators of energy type.
8. The self-contained motorization system according to claims 6, wherein the case also bears the direct current converter.
9. The self-contained motorization system according to claim 1, wherein the base is adapted to receive a plurality of sets of accumulators of energy type.
10. The self-contained motorization system according to claim 1, wherein the set of accumulators of power type uses the Ni-MH technology.
11. The self-contained motorization system according to claim 10, wherein the direct current converter is of the constant current output type.
12. The self-contained motorization system according to claim 1, wherein the set of accumulators of power type uses the Lithium technology.
13. The self-contained motorization system according to claim 12, wherein the direct current converter is of the constant current output and constant voltage output (CCCV) type.
14. The self-contained motorization system according to claim 1, wherein the set of accumulators of energy type uses the Lithium technology.
15. The self-contained motorization system according to claim 1, wherein the capacity of each set of accumulators is less than or equal to 100 Wh.
16. A vehicle wheel comprising at least one self-contained motorization system according to claim 1.
17. A tool comprising at least one self-contained motorization system according to claim 1.
18. A method for managing the charge of a set of accumulators of power type of a self-contained motorization system according to claim 1, the method comprising:
    computing or measuring the average current or the average energy consumed by the electric motor; and
    transmitting, using the central control unit, an instruction to adapt the output of the direct current converter to the average consumed current or the average consumed energy.
19. The management method according to claim 18, wherein the base is adapted to receive a plurality of sets of accumulators of energy type each embedding a direct current converter, the method comprising the transmission by the central control unit of an instruction to adapt the output of each direct current converter to the average current or average energy consumed by the electric motor, the output of each direct current converter being adapted to ensure a discharge of the plurality of sets of accumulators of energy type that is:
    sequential; or
    simultaneous, preferably when the average consumed current or the average consumed energy exceeds the maximum admissible discharge current or the maximum admissible discharge energy of a single set of accumulators of energy type.

20. A self-contained motorization system comprising:
  at least one electric motor;
  a controller adapted to drive the operation of the electric motor;
  a set of accumulators of power type adapted to feed the motor;
  a set of accumulators of energy type;
  a central control unit adapted to supervise the management of said set of accumulators and to drive the at least one electric motor through said controller;
  a base adapted to removably receive the set of accumulators of energy type;
  a direct current converter adapted to connect the set of accumulators of energy type to the set of accumulators of power type.

21. The self-contained motorization system according to claim 20, wherein the set of accumulators of energy type embeds the direct current converter.

22. The self-contained motorization system according to claim 21, wherein each set of accumulators of energy type embeds a direct current converter.

\* \* \* \* \*